US006978340B2

(12) United States Patent
Fisher et al.

(10) Patent No.: US 6,978,340 B2
(45) Date of Patent: Dec. 20, 2005

(54) I/O MULTIPLEXER AND PIN CONTROLLER WITH SERIAL AND PARALLEL CAPABILITIES FOR MICROPROCESSOR BASED ENGINE CONTROL

(75) Inventors: Rollie M. Fisher, Trenton, MI (US); Samuel J. Guido, Dearborn, MI (US); Martin G. Gravenstein, Nevada City, CA (US); Raymond A. Stevens, Monument, CO (US)

(73) Assignee: Visteon Corporation, Dearborn, MI (US)

( * ) Notice: Subject to any disclaimer, the term of this patent is extended or adjusted under 35 U.S.C. 154(b) by 671 days.

(21) Appl. No.: 09/774,230

(22) Filed: Jan. 30, 2001

(65) Prior Publication Data

US 2001/0044870 A1 Nov. 22, 2001

Related U.S. Application Data

(60) Provisional application No. 60/179,250, filed on Jan. 31, 2000.

(51) Int. Cl.$^7$ ............................................. G06F 13/00
(52) U.S. Cl. ..................... 710/316; 710/317; 710/38; 370/391
(58) Field of Search ................. 710/316–317, 710/4, 131, 36; 713/400; 370/391

(56) References Cited

U.S. PATENT DOCUMENTS

| | | | | |
|---|---|---|---|---|
| 5,734,920 A | * | 3/1998 | Gotoh et al. ................. 710/71 |
| 5,737,522 A | * | 4/1998 | Matsumoto .................. 714/49 |
| 5,987,623 A | * | 11/1999 | Ushida ........................... 714/6 |
| 6,138,185 A | * | 10/2000 | Nelson et al. ................ 710/33 |
| 6,301,509 B1 | * | 10/2001 | Obata .......................... 700/11 |
| 6,504,854 B1 | * | 1/2003 | Hofmann et al. ........... 370/518 |
| 6,606,678 B1 | * | 8/2003 | Nakamura ................... 710/305 |
| 6,674,303 B1 | * | 1/2004 | Morse et al. ................. 326/41 |
| 6,745,271 B2 | * | 6/2004 | Toda ........................... 710/104 |
| 2001/0025332 A1 | * | 9/2001 | Wang et al. ................ 710/132 |

* cited by examiner

*Primary Examiner*—Rehana Perveen
*Assistant Examiner*—Kim T. Huynh
(74) *Attorney, Agent, or Firm*—John Kajander

(57) ABSTRACT

A controller 12 has an I/O crossover switching network 14, an optional I/O network expansion 16, a plurality of serial I/O shifters 18, a clock generator 20 and I/O control logic 22. The I/O crossover-switching network 14 is also referred to as an I/O multiplexer. Serial data may be transferred between a serial I/O shifter and an external device by way of a dedicated serial data pin (SDATA) 24 or an optional alternate pathway 26 which uses one of a plurality of parallel pins 28. The optional alternate pathway 26 can be used when pins 28 are unavailable or to reduce the number of pins on the device 12. The controller is shown to communicate with an external device 30 also having parallel pins 32. While a single device 30 is shown, the external device 30 can be any number of a plurality of devices having serial and parallel signal pathways that is controlled by the microprocessor 10 of the present invention.

9 Claims, 5 Drawing Sheets

I/O MULTIPLEXER AND PIN CONTROLLER WITH SERIAL AND PARALLEL CAPABILITIES FOR MICROPROCESSOR BASED ENGINE CONTROL

RELATED APPLICATIONS

This application claims benefit of earlier filed provisional patent application Ser. No. 60/179,250, filed Jan. 31, 2000, entitled "I/O Multiplexer And Pin Controller With Serial And Parallel Capabilities For Microprocessor Based Engine Control."

TECHNICAL FIELD

The present invention relates generally to microprocessor based input/output systems, and more particularly to microprocessor based input/output systems that transfer I/O signals between system devices using both serial and parallel signal pathways.

BACKGROUND OF THE INVENTION

Current microprocessor based engine control systems communicate with a number of system devices. The engine control systems transfer input and output (I/O) signals between system devices using both serial and parallel signal pathways.

Present engine control systems have non-selectable signal pathways for the I/O signals that dedicate I/O signals and pin usage. Therefore, the systems have a very inflexible design in terms of I/O usage. There is a need for increased versatility of I/O signal and pin usage that allows multiplexing of alternative I/O signal pathways to device pins.

SUMMARY OF THE INVENTION

It is an object of the present invention to serially transfer selected parallel I/O signals to other devices while multiplexing alternative I/O signal pathways to device pins.

It is a further object of the present invention to provide an I/O crossover switching network, I.O shifters, a clock generator, and I/O control logic that can sample and serialize selected parallel I/O signals, synchronously transfer serial data, and reconstruct parallel I/O signals from an incoming serial data stream, while multiplexing alternative parallel I/O signal pathways to device pins.

In carrying out the above objects and other objects and features of the present invention, an I/O crossover switching network, also known as an I/O multiplexer, is provided having a plurality of serial I/O shifters, a clock generator and I/O control logic to provide an I/O multiplexer and pin controller with serial and parallel capabilities.

The present invention allows a system designer to independently select I/O signals for serial transfer and I/O signals for parallel transfer, an advantage of which is more versatile I/O signal usage and pin usage. The present invention provides a user with the capability to serially transfer selected I/O signals with other system devices while using one of several different serial timing protocols, which were designed to accommodate a variety of serial device interfaces.

Other objects and advantages of the present invention will become apparent upon reading the following detailed description and appended claims, and upon reference to the accompanying drawings.

BRIEF DESCRIPTION OF THE DRAWINGS

For a more complete understanding of this invention, reference should now be had to the embodiments illustrated in greater detail in the accompanying drawings and described below by way of examples of the invention. In the drawings.

DETAILED DESCRIPTION OF PREFERRED EMBODIMENTS

Figure 1:
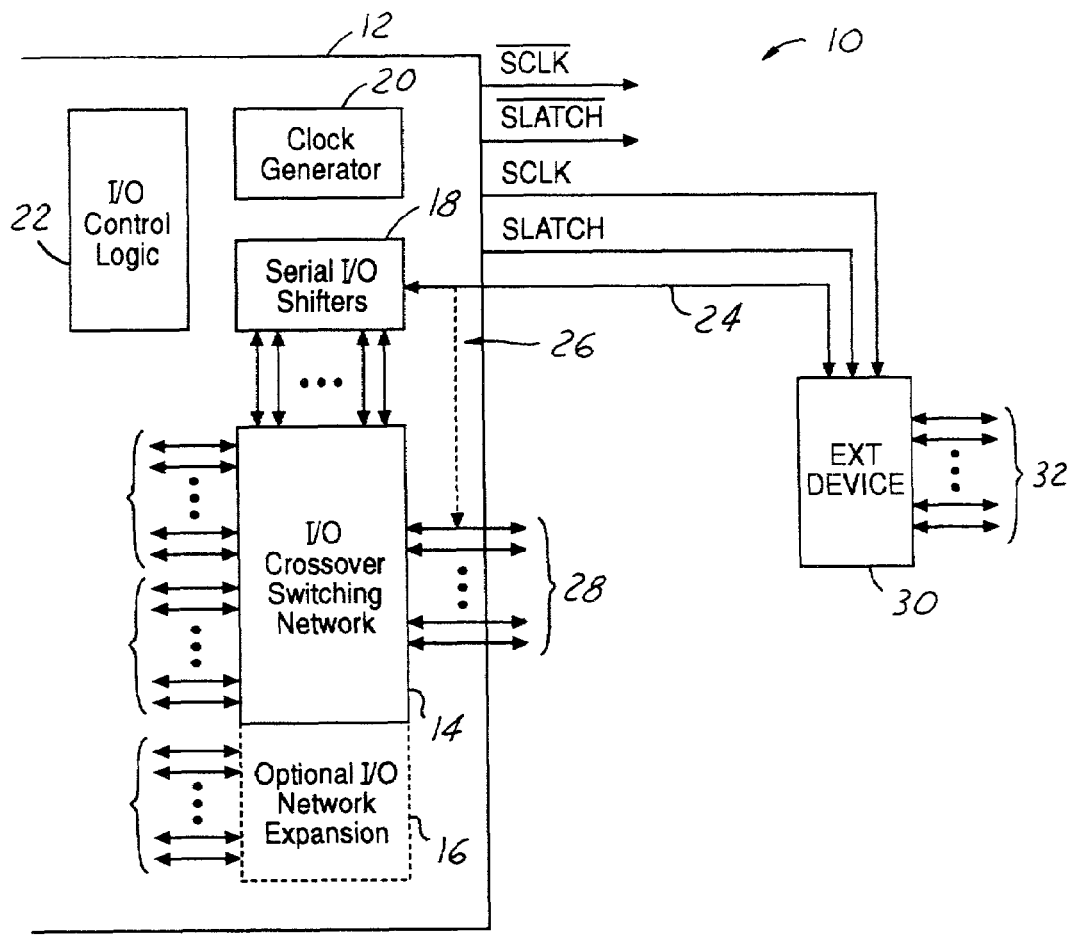
FIG. 1 is a block diagram of the I/O multiplexer and pin controller of the present invention.

FIG. 1 is a block diagram of the system 10 of the present invention. A controller 12 has an I/O crossover switching network 14, an optional I/O network expansion 16, a plurality of serial I/O shifters 18, a clock generator 20 and I/O control logic 22. The I/O crossover-switching network 14 is also referred to as an I/O multiplexer. Serial data may be transferred between a serial I/O shifter and an external device by way of a dedicated serial data pin (SDATA) 24 or an optional alternate pathway 26 which uses one of a plurality of parallel pins 28. The optional alternate pathway 26 can be used when pins 28 are unavailable or to reduce the number of pins on the device 12.

The controller is shown to communicate with an external device 30 also having parallel pins 32. While a single device 30 is shown, the external device 30 can be any number of a plurality of devices having serial and parallel signal pathways that is controlled by the microprocessor 10 of the present invention.

Figure 2:
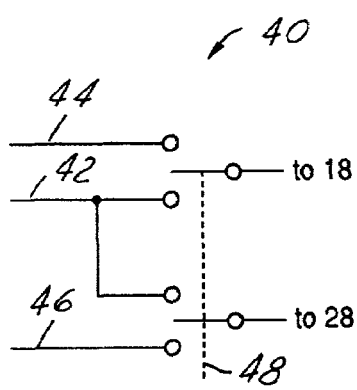
FIG. 2 is an I/O crossover-switching network according to one embodiment of the present invention.

One embodiment of the I/O crossover-switching network 14 is shown in detail in FIG. 2. The network 14 typically has a plurality of orthogonal input/output signal channels. However, for purposes of simplified presentation, FIG. 2 depicts a single I/O channel 40. The I/O channel 40 has a primary signal pathway 42, a secondary signal pathway 44, and an optional signal pathway 46. This allows a user to select either of the two signal pathways 42 or 44 respectively for connection to the serial I/O shifters (18 in FIG. 1). Either the primary signal pathway 42 or an optional signal pathway 46 can be selected for connection to a device pin (28 in FIG. 1).

The primary signal pathway 42 cannot be connected to the serial I/O shifter and a device pin at the same time. The selection is made by way of a bit control 48. Bit control 48 is a bit that selects whether the primary signal will be sent serially or in parallel. If the primary signal is sent serially, then the optional pathway is used to connect to the parallel pin. If the primary signal is sent in parallel, the secondary pathway will be used to connect to serially.

Figure 3:
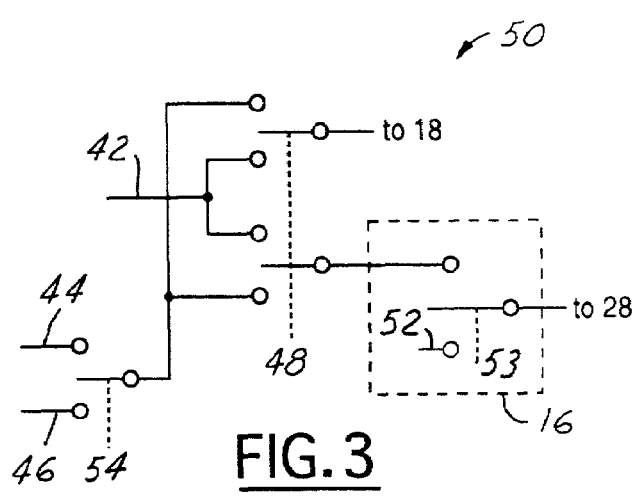
FIG. 3 is an I/O crossover-switching network according to another embodiment of the present invention.

Another embodiment of the I/O crossover-switching network 50 is shown in FIG. 3. Please note that in FIG. 3, like reference numbers denote like elements as shown in FIG. 2. The optional I/O network expansion 16 provides an additional optional signal pathway 52. There are three signal pathways available for connection to the serial I/O shifters 42, 44, 46 (18 in FIG. 1) and four signal pathways 42, 44, 46, and 52 available for connection to the pin 28. Bit control 53 and 54 is provided in the embodiment shown in FIG. 3.

The controller 12 has at least one serial I/O shifter 18, as shown in FIG. 1. Each shifter 18 can be configured as either a serial input shifter or a serial output shifter. As a serial input shifter, the device 18 can reconstruct, or deserialize, an incoming serial I/O data stream into parallel I/O signals. As a serial output shifter, the device 18 can serialize selected parallel I/O signals into a serial I/O data stream for output to the external device 30. The selection as to the direction of each shifter may be chosen by way of a software implementation.

According to the present invention, each shifter 18 is "n" bits wide. Each bit is associated with one parallel I/O signal as selected by the user through the I/O crossover-switching network 14. The state (1 or 0) of each bit denotes the signal level (high or low respectively) of the associated I/O signal.

Figure 5:
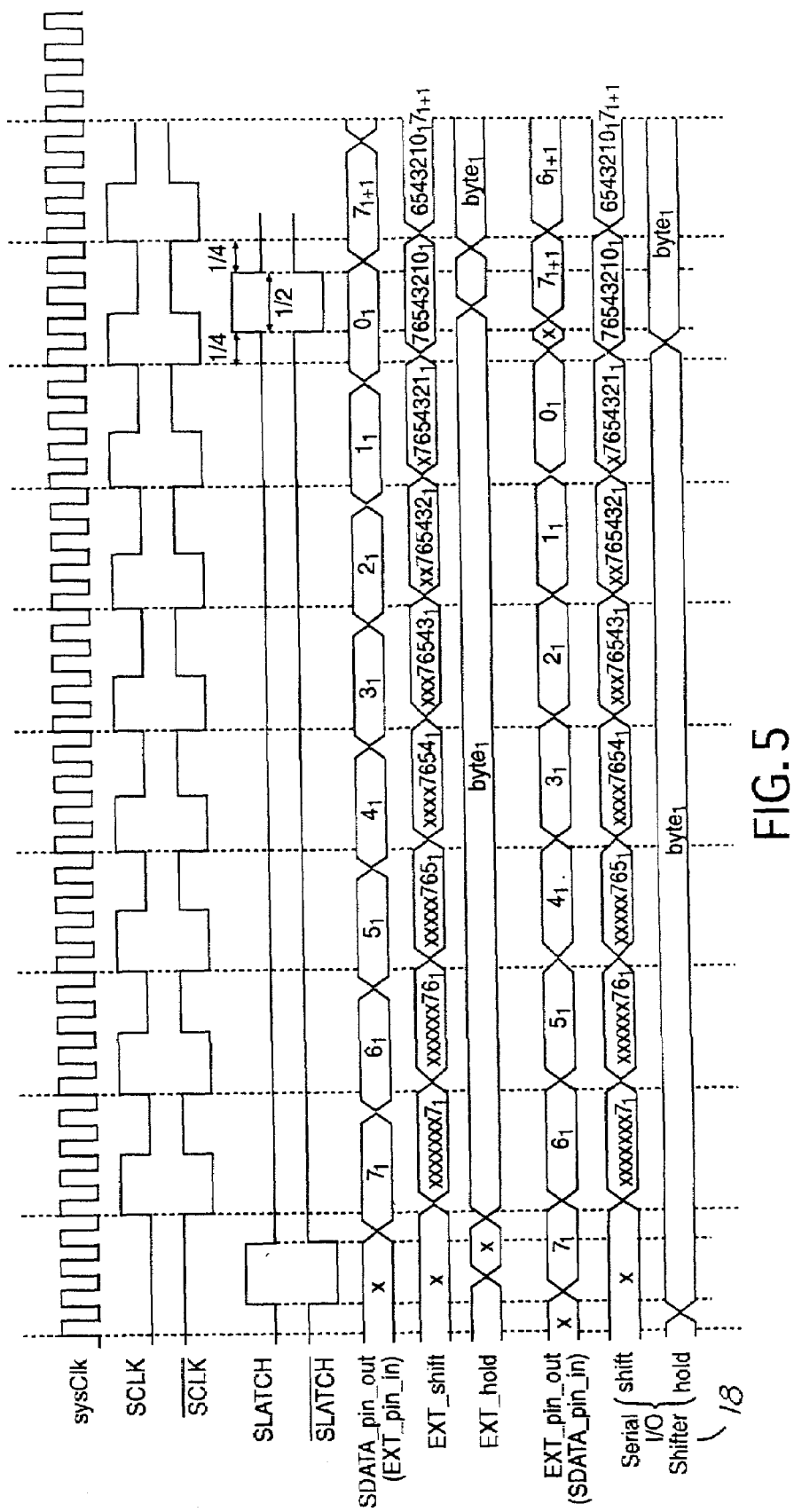
FIG. 5 is a serial shift timing example having eight signals.
Figure 6:
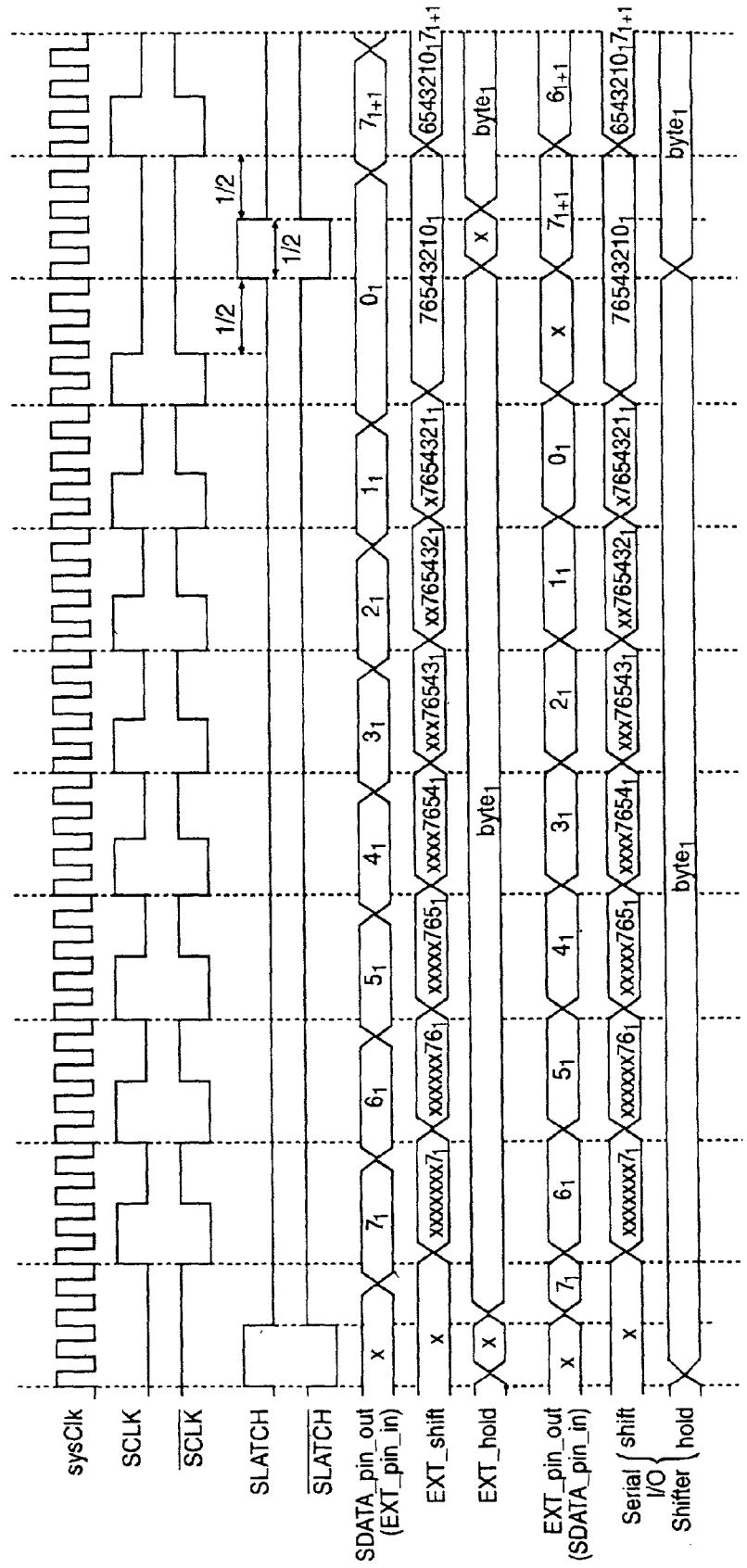
FIG. 6 is a serial shift timing with delay after transfer example having eight signals.

Once enabled, the operation of each shifter is continuous and cyclic. Referring now to FIGS. 5 and 6, each new cycle of the serial I/O data stream begins and the previous cycle ends on the first edge of a latch pulse, SLATCH. The most significant bit (MSB), bit "n", is the first bit shifted in and out of a serial I/O shifter 18, with the remaining bits shifted in and out in descending order to bit 0, which is the least significant bit (LSB).

In the example shown in FIG. 5, a single serial clock signal, SCLK, and a single serial latch pulse, SLATCH, are used for all of the serial I/O shifters in order to reduce the number of pins required for serial operations. It should be noted however, that it is possible to include more than one serial clock signal and more than one serial latch signal for individual serial I/O shifters as well as for groups of serial I/O shifters. The shifters can operate with a serial clock signal and a serial latch signal that is generated internally by the clock generator 20 shown in FIG. 1, or they may be received from an external source, not shown.

The signal pathways can be designated from a software register (not shown) or from a waveform generator (not shown). As discussed above, the network 14 can contain any number of channels. However, it is preferred that the basic arrangement of each channel is the same. For example, a network should have all channels having the configuration of either FIG. 2 or FIG. 3. Also, depending on the direction of the I/O signals, the pin and the serial I/O shifters can be used as input, output, or bi-directional. For example, the pin may be bi-directional while the shifter is used as an input or an output.

Software is responsible for the control of each serial I/O shifter. Each shifter can be enabled or disabled any time through software commands. However, the operation of all of the serial I/O shifters is synchronized to their respective SCLK and SLATCH signals. As a result, when more than one shifter is associated with a single clock and latch signal, data of all of the serial I/O shifters related to that particular SCLK signal and a SLATCH signal are serialized and deserialized in parallel.

The operation of the serial I/O shifters becomes transparent to the software, and once the shifters are enabled, their operation is autonomous. Therefore, to the software, the parallel pins of the external device appear as a typical software parallel port.

Figure 4:
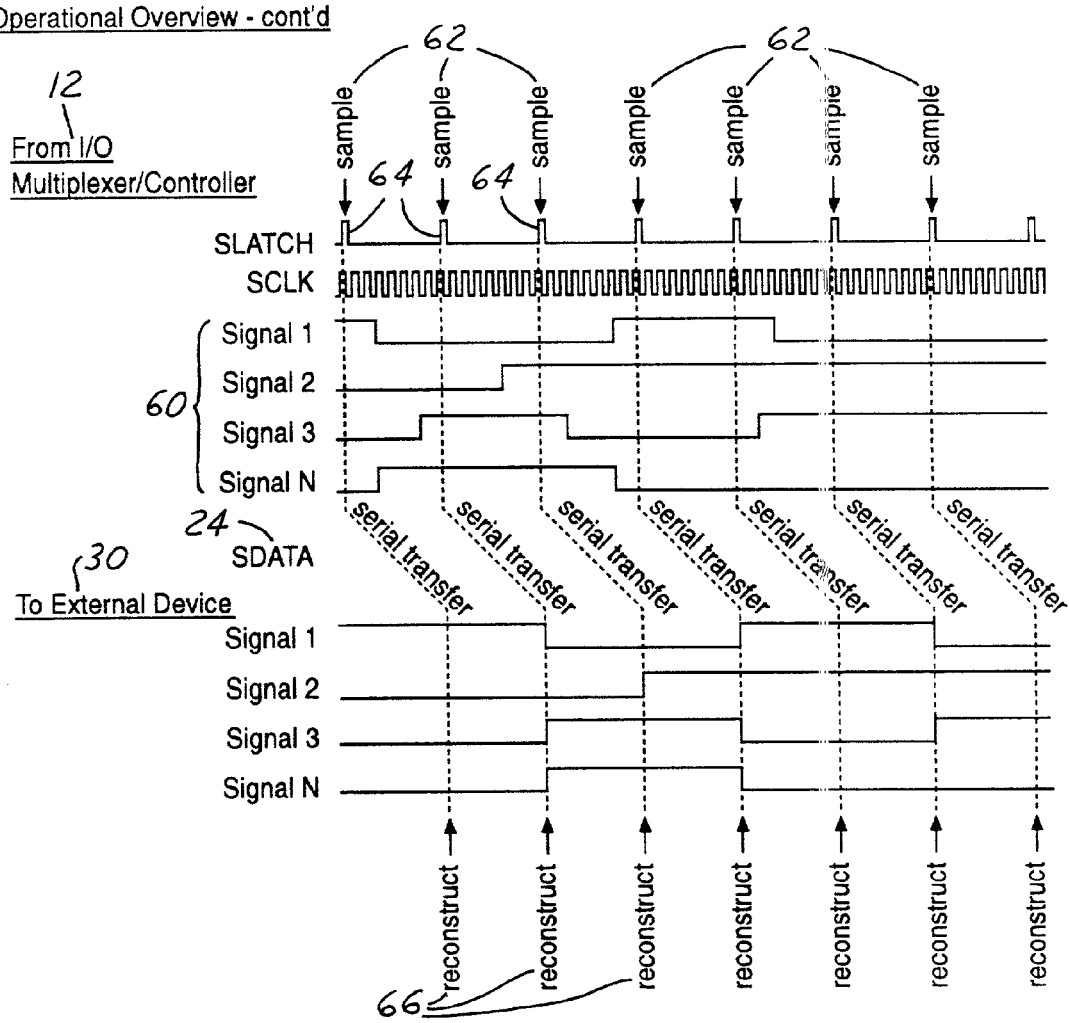
FIG. 4 is an example of serialization and reconstruction timing according to the present invention.

Referring now to FIG. 4, the serialization process will be described. Selected parallel I/O signals 60 (i.e. signals 1 through n) are sampled 62 by the serial I/O shifter on the first edge 64 of the SLATCH signal. Thereafter, the bits of the data stream are serially transferred from the I/O multiplexer/controller 12 to the external device 30 at the rate of one bit per SCLK cycle through SDATA 24 or another optional path (not shown in FIG. 4, but labeled 26 in FIG. 1). Once all "n" bits have been clocked into the external device, the SLATCH signal is asserted to enable the external device 30 to output the data as parallel I/O signals. Then the serial I/O data stream cycle repeats.

The resolution of the parallel I/O signals at the output of the external device 30 is dependent upon the number of data bits serially transferred, the frequency of SCLK, and the assertion 64 of SLATCH. It should be noted that reconstruction 66 of the serial I/O data at the parallel outputs 32 of the external device 30 occurs on the assertion of SLATCH. Therefore, the resolution can be calculated using the frequency of SLATCH. The sampling rate of a typical serial I/O shifter is twice the speed of the system clock.

Deserialization is also discussed with reference to FIG. 4. Parallel reconstruction of the serial I/O data stream begins on the assertion 64 of SLATCH to the external device 30. Thereafter, serial I/O data from the external device is clocked into the serial I/O shifter at the rate of one bit per SCLK cycle. Once all "n" bits of the serial I/O data stream have been clocked into the shifter by way of SDATA 24, or another alternate path, the shifter reconstructs the serial data into parallel I/O signals. The parallel I/O signals are then output to the I/O crossover-switching network. At the same time, SLATCH is asserted to the external device for the next serial transfer. The maximum resolution of the reconstructed parallel I/O signals is determined by the number of bits serially transferred, clock speed, and the assertion of SLATCH.

Referring again to FIG. 1, the clock generator 20 will output the serial clock signal and the associated latch signal. The clock signal SCLK is used to clock the serial data transferred between the serial I/O shifters and the external devices. The latch signal SLATCH is used to delimit the n-bit boundaries in the serial data stream.

To accommodate a large variety of off-the-shelf serial device interface timing protocols, the clock and latch signals SCLK and SLATCH are also available as inverted signals, $\overline{SCLK}$ and $\overline{SLATCH}$. The frequency of the clock signal is selectable and the output of SLATCH can be delayed, as shown in FIG. 6. In the example shown in FIG. 6, n=8 and the latch signal is delayed by a fraction of the clock signal, SCLK. The delay after transfer is basically a predetermined delay, i.e. 2 SCLK, between consecutive serial data streams. This feature may be necessary for some external devices that require additional setup or hold time to latch the serial data in parallel form, or vice versa.

The data can be clocked and latched on any edge or level of SCLK and SLATCH according to the connection of the external device to the SCLK, $\overline{SCLK}$, SLATCH, or $\overline{SLATCH}$ signals. It should be noted that SCLK and the number of serial bits in the serial I/O data stream determine the serial transfer rate, i.e., baud rate (bits per second), of the serial I/O shifters.

Figure 7:
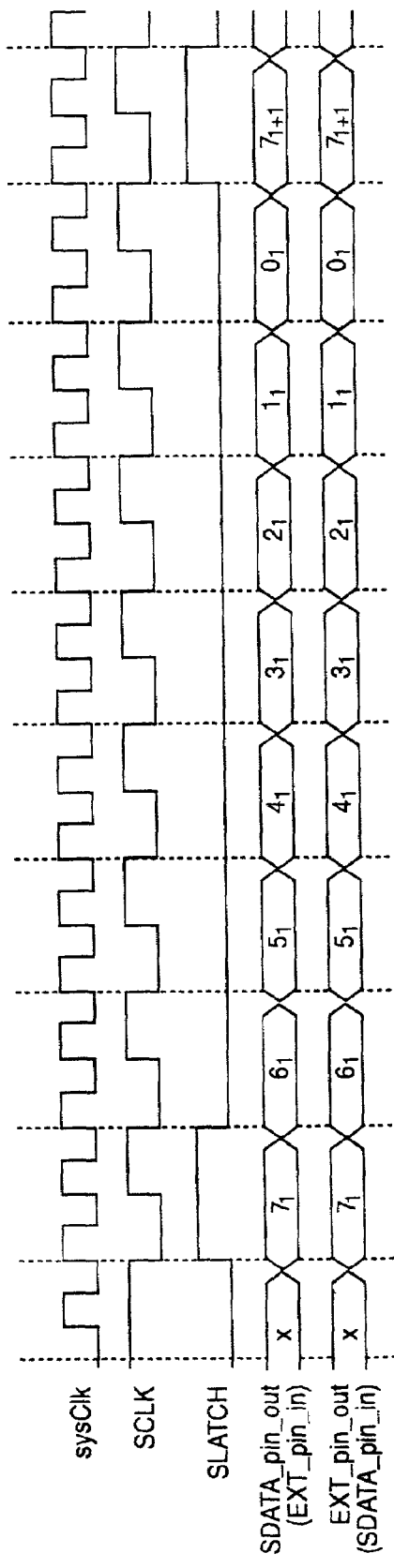
FIG. 7 is another embodiment of the present invention having high-speed serial shift timing.

FIG. 7 depicts another embodiment 70 of the present invention that has high-speed serial shift timing of the I/O multiplexer/controller. The fastest possible serial I/O transfer rate attainable is by clocking serial data out of the serial I/O shifter (or external device) on one edge 72 of SCLK and then clocking it into the external device (or serial I/O shifter) on the following edge of SCLK. SLATCH is asserted for one SCLK cycle, and it coincides with the SCLK cycle for bit "n", the most significant bit, of the serial data stream. The frequency of SCLK is typically one-half the frequency of the system clock, sysClk. It should be noted that a 50% duty cycle of SCLK is not critical for the high-speed serial I/O operation.

The invention covers all alternatives, modifications, and equivalents, as may be included within the spirit and scope of the appended claims.

What is claimed is:

1. A controller for microprocessor input/output to at least one external device, said controller comprising:
   control logic;
   an Input/Output (I/O) crossover-switching network having a plurality of parallel pins;
   at least one serial I/O shifter in communication with said I/O crossover-switching network, said at least one serial I/O shifter having at least one serial I/O shifter having at least one channel;
   a clock signal for clocking a transfer of serial data from said controller to the external device, said clock signal for synchronizing the operation of said at least one serial I/O shifter;
   primary and secondary I/O signal pathways controlled by said I/O crossover-switching network for selecting I/O signals and usage of said plurality of parallel pins for communication with and control of the external device; and
   wherein for said at least one channel, a first signal pathway is selectable between at least said primary signal pathway and said secondary signal pathway for connection to said at least one serial I/O shifter.

2. The controller as claimed in claim 1 further comprising;
   optional signal pathways controlled by said I/O crossover-switching network for selecting I/O signals and usage of said plurality of parallel pins for communication with and control of the external device; and
   wherein for said at least one channel, a second signal pathway is selectable between at least said primary signal pathway and said optional signal pathway for connection to a pin on the external device, said primary signal pathway being available to either said first signal pathway or said second signal pathway.

3. The controller as claimed in claim 1 further comprising an external source for said clock and latch signals.

4. The controller as claimed in claim 1 wherein said serial I/O shifter further comprises a high-speed serial shifter wherein serial data is transferred out of said shifter on one edge of said clock signal and transferred to said external device on the following edge of said clock signal.

5. A method for serializing parallel data comprising the steps of:
   sampling selected parallel I/O signals with a serial I/O shifter;
   selecting a signal path from a primary, secondary or optional signal path;
   serially transferring bits of the data stream from an I/O multiplexer to an external device at the rate of one bit per cycle of a clock signal;
   asserting a latch signal for enabling an external device; and
   outputting data as parallel I/O signals.

6. The method as claimed in claim 5 wherein said step of serially transferring bits of the data stream further comprises serially transferring bits at a rate of one bit per cycle of a clock signal.

7. The method as claimed in claim 5 wherein said step of sampling selected parallel I/O signals further comprises sampling selected parallel I/O signals on the leading edge of a latch signal to create a bit data stream.

8. The method as claimed in claim 5 wherein said step of outputting data further comprises setting a resolution of the parallel I/O signals using a frequency of the latch signal.

9. The method as claimed in claim 5 wherein said step of serially transferring bits further comprises serially transferring bits out of the serial I/O shifter on one edge of the clock signal; and
   transferring bits from said I/O shifter to said external device on the following edge of the clock signal.

* * * * *